(12) United States Patent
Holtmanns et al.

(10) Patent No.: US 9,712,506 B2
(45) Date of Patent: Jul. 18, 2017

(54) METHODS, APPARATUSES, SYSTEM AND COMPUTER PROGRAMS FOR KEY UPDATE

(75) Inventors: Silke Holtmanns, Klaukkala (FI); Tao Haukka, Oulu (FI); Pekka Johannes Laitinen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 1709 days.

(21) Appl. No.: 12/600,128

(22) PCT Filed: Apr. 2, 2008

(86) PCT No.: PCT/EP2008/053953
§ 371 (c)(1),
(2), (4) Date: Jan. 12, 2010

(87) PCT Pub. No.: WO2008/138677
PCT Pub. Date: Nov. 20, 2008

(65) Prior Publication Data
US 2010/0303242 A1  Dec. 2, 2010

Related U.S. Application Data

(60) Provisional application No. 60/924,450, filed on May 15, 2007.

(51) Int. Cl.
*H04L 9/08* (2006.01)
*H04L 29/06* (2006.01)
(Continued)

(52) U.S. Cl.
CPC ............ *H04L 63/06* (2013.01); *H04L 63/108* (2013.01); *H04W 12/04* (2013.01); *H04L 2209/601* (2013.01); *H04W 4/12* (2013.01)

(58) Field of Classification Search
CPC . H04L 63/08; H04L 2209/601; H04L 63/108; H04L 63/062; H04L 63/06; H04L 9/08; H04W 12/04; H04W 4/12
(Continued)

(56) References Cited

U.S. PATENT DOCUMENTS

2003/0166398 A1  9/2003  Netanel
2005/0102501 A1  5/2005  Haukka et al.
(Continued)

FOREIGN PATENT DOCUMENTS

| EP | 1124401 A | 8/2001 |
|---|---|---|
| WO | 99/38288 A | 7/1999 |
| WO | 03/088617 A | 10/2003 |

OTHER PUBLICATIONS

"3GPP", 3GPP TS 33.246, Pub. Mar. 2007. pp. 1-46.*
(Continued)

*Primary Examiner* — Oscar Louie
*Assistant Examiner* — James Forman
(74) *Attorney, Agent, or Firm* — Mintz Levin Cohn Ferris Glovsky and Popeo, P.C.

(57) ABSTRACT

It is disclosed a method comprising monitoring validity of limited-validity key information, acquiring, from a network entity upon invalidity of the limited-validity key information, limited-validity transaction identification information based on unlimited-validity identification information identifying a terminal, generating new limited-validity key information based on the acquired limited-validity transaction identification information, and transmitting the acquired limited-validity transaction identification information to a network element.

15 Claims, 4 Drawing Sheets

(51) Int. Cl.
*H04W 12/04* (2009.01)
*H04W 4/12* (2009.01)

(58) Field of Classification Search
USPC ........................................................ 380/278
See application file for complete search history.

(56) References Cited

U.S. PATENT DOCUMENTS

| | | | | |
|---|---|---|---|---|
| 2006/0282882 | A1* | 12/2006 | Bajko ................... | H04L 9/0844 726/4 |
| 2007/0192838 | A1* | 8/2007 | Laitinen ................. | H04L 63/08 726/4 |
| 2007/0223703 | A1* | 9/2007 | Verma ................... | H04L 9/0822 380/278 |
| 2008/0114978 | A1* | 5/2008 | Lehtovirta et al. ........... | 713/155 |
| 2008/0160959 | A1* | 7/2008 | Huang et al. ................. | 455/411 |
| 2009/0247208 | A1* | 10/2009 | Lohmar et al. ............... | 455/519 |

OTHER PUBLICATIONS

"3GPP 109", 3GPP TS 22.109, Pub. Sep. 2004. pp. 1-21.*
GPP TS AB. Cde V0.3.0: 3rd Generation Partnership Project: Technical Specification Group Services and System Aspects; Bootstrapping of Application Security Using AKA and Support for Subscriber Certificates; System Description XP-002320570 Sep. 2003.
3rd Generation Partnership Project; Technical Specification Group Services and System Aspects; Generic Authentication Architecture (GAA); Generic Bootstrapping Architecture (Release 6):, XP-002293950, 3GPP TSG SA WG3 Security—Sd#32; GPP TS 33.220 V1.1.0, Feb. 2004.
Glass, S.et al.; "Mobile IP Authentication, Authorization and Accounting Requirements", XP-002213102, Oct. 2000, pp. 1-27.
"International Search Report of the International Searching Authority", received in corresponding PCT Application No. PCT/EP2008/053953, Dated Nov. 20, 2008, 41 pages.
Menezes et al., "Handbook of Applied Cryptography", CRC Press LLC, USA, 1997, Ch. 13, pp. 546-570.
3GPP TS 33.246, V6.10.0, 3rd Generation Partnership Project; Technical Specification Group Services and System Aspects; 3G Security; Security of Multimedia Broadcast/Multicast Service (Release 6),Mar. 2007.
3GPP TSG SA WG3 Security—S3#32 S3-040076, Feb. 9-13, 2004, Edinburgh, UK, Source: Nokia, Title: UE triggered unsolicited push from BSF to NAF.
Office Action received from corresponding Korean Application No. 10-2009-7026167, dated Feb. 28, 2011, 6 pages.

* cited by examiner

US 9,712,506 B2

METHODS, APPARATUSES, SYSTEM AND COMPUTER PROGRAMS FOR KEY UPDATE

RELATED APPLICATION

This application was originally filed as PCT Application No. PCT/EP2008/053953 filed Apr. 2, 2008 which claims priority to U.S. Provisional Application No. 60/924,450 filed May 15, 2007.

FIELD OF THE INVENTION

The present invention relates to methods, apparatuses, a system and computer programs for key update e.g. for any NAF (Network Application Function) using a GBA (Generic Bootstrapping Architecture) service. In particular, MBMS (multimedia broadcast/multicast service) is an example service in which the proposed key update according to the present invention may be deployed.

BACKGROUND

3GPP Mobile Broadcast Multicast Systems (MBMS) offering Mobile TV service is now requested by mobile operators. MBMS uses, for security purposes, 3GPP Generic Bootstrapping Architecture (GBA).

In the 3GPP specification TS 33.220 (e.g. BSF (Bootstrapping Server Function), GBA), section 4.5.3, TS 33.220 has following functions: "If the NAF shares a key with a UE (User equipment), but the NAF requires an update of that key, e.g. because the key's lifetime has expired or will expire soon, or the key can not meet the NAF local validity condition, it shall send a suitable bootstrapping renegotiation request to the UE. If the key's lifetime has expired, the protocol used over reference point Ua (to be described herein below) shall be terminated. The form of this indication depends on the particular protocol used over reference point Ua. If the UE receives a bootstrapping renegotiation request, it starts a run of the protocol over reference point Ub, as specified in clause 4.5.2 and 5.3 and Annex I, in order to obtain a new key Ks (referred to as master key information herein below)."

Furthermore, the MBMS security specification 3GPP TS 33.246 defines: "Along with the GBA-keys, the BSF shall send an IMPI (International Mobile Subscriber Persistent Identity) of the user (equipment) to the BM-SC (Broadcast-Multicast Service Center), which is the content providing server. When the UE has bootstrapped, the UE will use a new B-TID (Bootstrapping Transaction Identifier) over the Ua reference point. The IMPI is used in the BM-SC to bind the old and the new B-TID together."

An MBMS service solicited pull procedure is the bootstrapping renegotiation request quoted above. The procedure is performed as e.g. described in 3GPP TS 33.246. The solicited pull procedure performs following steps:

1. A BM-SC (Broadcast-Multicast Service Center) (that may act as a GBA NAF) is configured to send an empty MIKEY (Multimedia Internet Keying) message to trigger the UE.

2. The UE is then be configured to perform a bootstrapping procedure which then results a new MUK (MBMS User Key). The UE is configured to contact the BSF and to run GBA as normal. Afterwards, the UE is configured to run a new MUK key, but the application server (BM-SC) has no information of the fact that the UE is configured to use a new MUK, i.e. that the UE can be taken into use for the service.

In an initial procedure of MBMS service, the BM-SC is configured to contact the GBA server after receiving a register request of the UE. During service procedure, however, the MUK update is slightly different: When a user (equipment) is using a valid MSK (MBMS Service Key) e.g. for watching TV program, then the UE does not need to register again (the UE is already registered).

SUMMARY

The above-described procedure results in a problem that without a registration method, the BM-SC has no information on how to contact the GBA server so as to refresh the MUK in the MUK expiry scenario. In other words, the BM-SC has no information that a new key has been actually requested by the user equipment.

The MBMS User Key (MUK) needs to be updated when it expires. For this purpose, 3GPP defined the solicited pull procedure, but during implementation it turned out that this procedure is not complete and does not work as it is defined in the moment. This key replacement should be done in a smooth manner to avoid interruptions of user service consumption (e.g. watching a TV news service or ice hockey game).

The following approaches are suggested:

1—BSF pushes information to BM-SC

Currently, the Zn reference point (i.e. interface between the BSF and the NAF, e.g. the BM-SC) works in pull mode. The BSF pushing the information to the BM-SC, that a new bootstrapping run has taken place, may have impacts on TS 33.246, TS 29.109 and TS 33.220.

2—UE starts again from the beginning

In this approach, the UE may start again from the beginning. The UE may de-register completely and re-register again, then the normal procedure of MBMS and GBA may take place and the new MUK key may be used. This would have no impact on any specification.

3—Keep MUK and MSK lifetime synchronized

In this approach, the key lifetimes of MSK and MUK may be the same. Hence, if the MUK expires, also the MSK expires. Thus, renewing of the MUK happens at the same time when the MSK is issued. In other words, the procedure can always behave the same way as initial procedure.

In consideration of the above, it is an object of the present invention to overcome one or more of the above drawbacks. In particular, the present invention provides methods, apparatuses, a system and computer programs for key update.

According to the present invention, in a first aspect, this object is for example achieved by a method comprising:

monitoring validity of limited-validity key information;

acquiring, from a network entity upon invalidity of the limited-validity key information, limited-validity transaction identification information based on unlimited-validity identification information identifying a terminal;

generating new limited-validity key information based on the acquired limited-validity transaction identification information; and transmitting the acquired limited-validity transaction identification information to a network element.

According to further refinements of the invention as defined under the above first aspect, in the transmitting, the limited-validity transaction identification information is transmitted as an option portion of a registration message;

in the transmitting, the limited-validity transaction identification information is a register command, and wherein absence of indication of limited-validity service key information in the register command indicates service continuity;

the generating comprises establishing limited-validity master key information and deriving limited-validity key information from the established limited-validity master key information.

According to the present invention, in a second aspect, this object is for example achieved by a method comprising:

sending, to a network entity, unlimited-validity identification information identifying a terminal;

receiving, from the network entity, limited-validity key information synchronized with corresponding limited-validity key information of the terminal; and generating limited-validity service information using the received limited-validity key information.

According to further refinements of the invention as defined under the above second aspect, the sending is performed a predetermined time after initiation of a solicited pull procedure;

the method according to the second aspect further comprises receiving a network application function identity from the terminal.

According to the present invention, in a third aspect, this object is for example achieved by a method comprising:

receiving, from a network element, unlimited-validity identification information identifying a terminal;

generating limited-validity key information synchronized with corresponding limited-validity key information of the terminal based on the received unlimited-validity identification information; and sending, to the network element, the generated limited-validity key information.

According to further refinements of the invention as defined under the above first to third aspects, the limited-validity key information is a multimedia broadcast multicast service user key;

the limited-validity service key information is a multimedia broadcast multicast service key;

the limited-validity transaction identification information is a bootstrapping transaction identifier;

the unlimited-validity identification information is an international mobile subscriber persistent identity;

the terminal is a user equipment;

the network entity is a bootstrapping server function;

the network element is at least one of a broadcast-multicast service center and a network application function.

According to the present invention, in a fourth aspect, this object is for example achieved by an apparatus comprising:

a monitor configured to monitor validity of limited-validity key information;

an acquirer configured to acquire, from a network entity upon invalidity of the limited-validity key information, limited-validity transaction identification information based on unlimited-validity identification information identifying a terminal;

a generator configured to generate new limited-validity key information based on the acquired limited-validity transaction identification information; and a transmitter configured to transmit the acquired limited-validity transaction identification information to a network element.

According to further refinements of the invention as defined under the above fourth aspect, the transmitter is configured to transmit the limited-validity transaction identification information as an option portion of a registration message;

the transmitter is configured to transmit the limited-validity transaction identification information as a register command, and to indicate service continuity by lack of indication of limited-validity service key information in the register command;

the generator is configured to establish limited-validity master key information and to derive limited-validity key information from the established limited-validity master key information.

According to the present invention, in a fifth aspect, this object is for example achieved by an apparatus comprising:

a sender configured to send, to a network entity, unlimited-validity identification information identifying a terminal;

a receiver configured to receive, from the network entity, limited-validity key information synchronized with corresponding limited-validity key information of the terminal; and a generator configured to generate limited-validity service information using the received limited-validity key information.

According to further refinements of the invention as defined under the above fifth aspect, the sender is configured to send a predetermined time after initiation of a solicited pull procedure;

the receiver is configured to further receive a network application function identity from the terminal.

According to the present invention, in a sixth aspect, this object is for example achieved by an apparatus comprising:

a receiver configured to receive, from a network element, unlimited-validity identification information identifying a terminal;

a generator configured to generate limited-validity key information synchronized with corresponding limited-validity key information of the terminal based on the received unlimited-validity identification information; and a sender configured to send, to the network element, the generated limited-validity key information.

According to further refinements of the invention as defined under the above fourth to sixth aspects, the limited-validity key information is a multimedia broadcast multicast service user key;

the limited-validity service key information is a multimedia broadcast multicast service key;

the limited-validity transaction identification information is a bootstrapping transaction identifier;

the unlimited-validity identification information is an international mobile subscriber persistent identity;

the terminal is a user equipment;

the network entity is a bootstrapping server function;

the network element is at least one of a broadcast-multicast service center and a network application function;

at least one of the network element and the network entity are implemented as a chip.

According to the present invention, in a seventh aspect, this object is for example achieved by a system comprising:

the apparatus according to the fourth aspect; or the apparatuses according to the fifth and sixth aspects.

According to the present invention, in an eighth aspect, this object is for example achieved by an apparatus comprising:

means for monitoring validity of limited-validity key information;

means for acquiring, from network entity means upon invalidity of the limited-validity key information, limited-validity transaction identification information based on unlimited-validity identification information identifying a terminal means;

means for generating new limited-validity key information based on the acquired limited-validity transaction identification information; and means for transmitting the acquired limited-validity transaction identification information to a network element.

According to the present invention, in a ninth aspect, this object is for example achieved by an apparatus comprising:

means for sending, to network entity means, unlimited-validity identification information identifying a terminal means;

means for receiving, from the network entity means, limited-validity key information synchronized with corresponding limited-validity key information of the terminal means; and means for generating limited-validity service information using the received limited-validity key information.

According to the present invention, in a tenth aspect, this object is for example achieved by an apparatus comprising:

means for receiving, from a network element means, unlimited-validity identification information identifying a terminal means;

means for generating, limited-validity key information synchronized with corresponding limited-validity key information of the terminal based on the received unlimited-validity identification information; and means for sending, to the network element means, the generated limited-validity key information.

According to the present invention, in an eleventh aspect, this object is for example achieved by a computer program embodied on a computer-readable medium, configured to control a method comprising:

monitoring validity of limited-validity key information;

acquiring, from a network entity upon invalidity of the limited-validity key information, limited-validity transaction identification information based on unlimited-validity identification information identifying a terminal;

generating new limited-validity key information based on the acquired limited-validity transaction identification information; and transmitting the acquired limited-validity transaction identification information to a network element.

According to the present invention, in a twelfth aspect, this object is for example achieved by a computer program embodied on a computer-readable medium, configured to control a method comprising:

sending, to a network entity, unlimited-validity identification information identifying a terminal;

receiving, from the network entity, limited-validity key information synchronized with corresponding limited-validity key information of the terminal; and generating limited-validity service information using the received limited-validity key information.

According to the present invention, in a thirteenth aspect, this object is for example achieved by a computer program embodied on a computer-readable medium, configured to control a method comprising:

receiving, from a network element, unlimited-validity identification information identifying a terminal;

generating, limited-validity key information synchronized with corresponding limited-validity key information of the terminal based on the received unlimited-validity identification information; and sending, to the network element, the generated limited-validity key information.

In this connection, it has to be pointed out that the present invention enables one or more of the following:

A missing function of GBA is provided, which function affects all NAF services requiring continuous bootstrapping service.

Seamless service continuity, i.e. improved user experience, since e.g. a service consumption remains uninterrupted (e.g. streaming and watching a soccer game or news via Mobile TV without interruptions due to any key negotiations).

Existing GBA Architecture remains unaffected in terms of major changes e.g. to TS 33.220 and TS 33.246 defined by 3GPP.

BRIEF DESCRIPTION OF THE DRAWINGS

Embodiments of the present invention are described herein below with reference to the accompanying drawings, in which.

DETAILED DESCRIPTION OF EMBODIMENTS OF THE PRESENT INVENTION

Embodiments of the present invention are described herein below by way of example with reference to the accompanying drawings.

It is to be noted that for this description, abbreviations MUK, IMPI etc. are examples for the limited-validity key information, unlimited-validity transaction identification information etc., respectively, without restricting the latter terms to the special technical or implementation details imposed to these abbreviations.

First Embodiment

Herein below, the first embodiment of the present invention is described with reference to FIGS. 1 and 2. According to the first embodiment, the existing procedure is used with new parameter to indicate to the BM-SC that the BM-SC is to start pulling a new MSK key procedure. In this case, the terminal or UE does not need to perform de-registration procedure. Instead, the UE may be configured to attempt re-registration.

Figure 1:
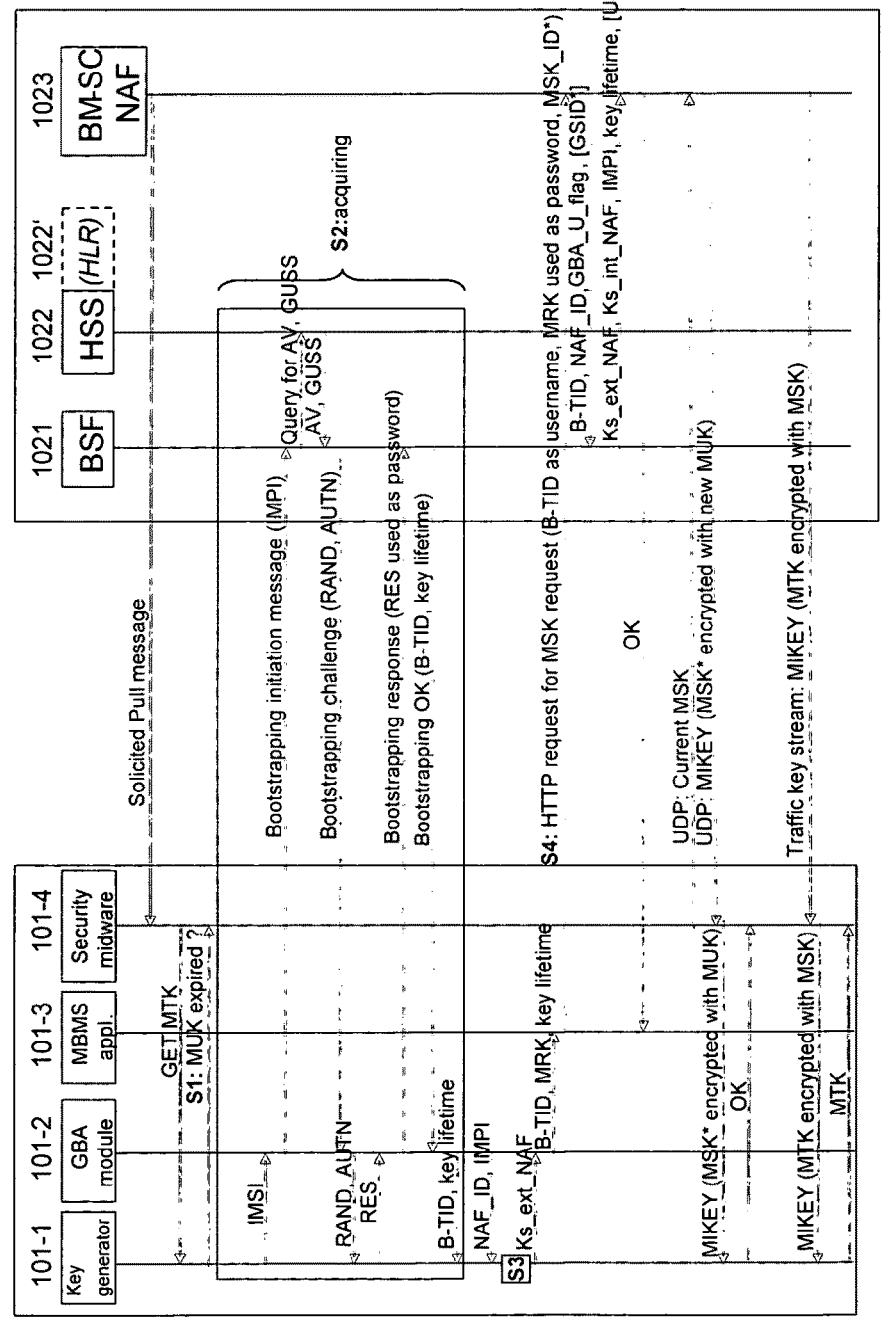
FIG. 1 shows a method for key update according to a first embodiment of the present invention.

FIG. 1 shows a method for key update according to the first embodiment of the present invention. Signaling between elements is indicated in horizontal direction, while time aspects between signaling are reflected in the vertical arrangement of the signaling sequence as well as in the sequence numbers.

As shown in FIG. 1, a communication system 100 comprises the user equipment UE 101 and an access network 102. The UE 101 comprises a key generator 101-1, a GBA module 101-2, an MBMS application 101-3 (e.g. Mobile TV) and a security midware 101-4 for keying between the UE 101 and the BM-SC, NAF 1023. The access network 102 serves e.g. for providing access to various services, and comprises the BSF 1021, a HSS (Home subscriber server)

1022 (or, if connected to a legacy network, optionally a Home location register HLR 1022') and the BM-SC 1023 acting as the NAF.

As a preparatory measure, the BM-SC, NAF 1023 sends a solicited pull message to the security midware 101-4 of the UE 101, which in turn issues a "GET MTK" to the key generator 1011.

In step S1, monitoring of a validity of limited-validity key information (e.g. a MUK) is performed.

In step S2, upon invalidity of the limited-validity key information, acquiring of limited-validity transaction identification information (e.g. B-TID) based on unlimited-validity identification information (e.g. IMPI) identifying the terminal (e.g. UE 101) is performed. In particular, step S2 may e.g. be performed as a bootstrapping procedure between the UE 101 and the BSF 1021.

In step S3, generating of new limited-validity key information (e.g. a new MUK) based on the acquired limited-validity transaction identification information (e.g. B-TID) is performed. In particular, the generating operation may e.g. comprise establishing limited-validity master key information (e.g. a Ks) and deriving limited-validity key information (e.g. new MUK) from the established limited-validity master key information.

In step S4, transmitting of the acquired limited-validity transaction identification information (B-TID) to a network element (e.g. BM-SC, NAF) is performed. In particular, the transmitting operation may e.g. be performed using an option portion of a registration message, which may indicate the capability of the UE 101 to update a new MUK. Alternatively, the transmitting operation may e.g. use a register command as limited-validity transaction identification information (e.g. B-TID), wherein absence/presence of limited-validity service key information (e.g. a list of MSKs) may indicate continuity/discontinuity of service, i.e. no need/need of pushing limited-validity service key information (e.g. MSKs).

Figure 2:
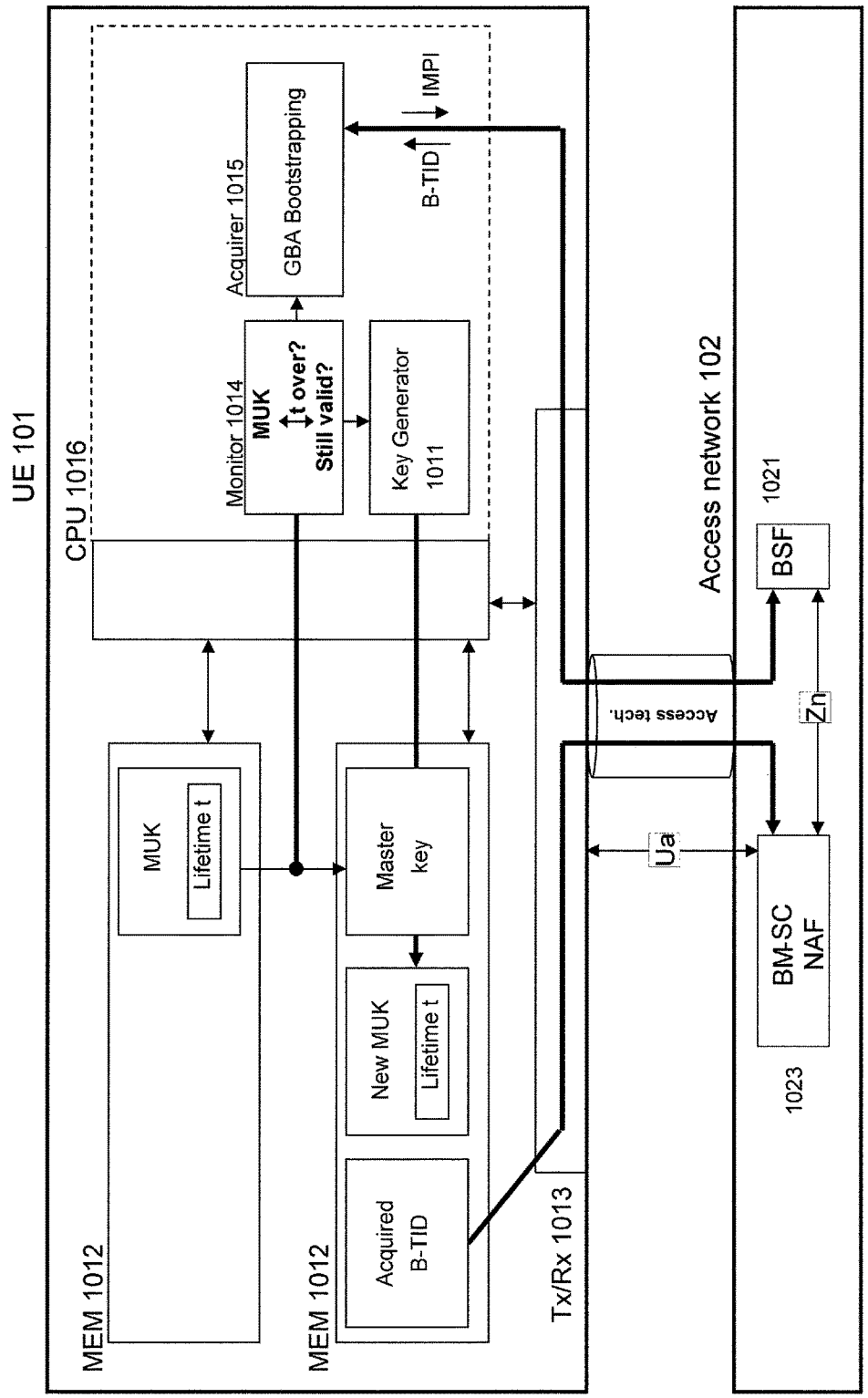
FIG. 2 shows an apparatus (e.g. a user equipment) for key update according to the first embodiment of the present invention.

FIG. 2 shows an apparatus (e.g. a user equipment) for key update according to the first embodiment of the present invention.

The UE 101, in addition and/or cooperation to the means described in conjunction with FIG. 1, comprises a key generator 1011, a memory 1012, a transceiver Tx/Rx 1013, a monitor 1014, an acquirer 1015 and a CPU 1016. As indicated with the dashed functional block of the CPU 1016, the key generator 1011, the monitor 1014 and the acquirer 1015 may be implemented e.g. as software running on the CPU 1016 or as separate entities. It is to be noted that the functionalities of the Tx/Rx 1013 may alternatively be performed by a separate sender and a separate receiver (not shown). For descriptive purposes, the interface between the UE 101 and the BM-SC, NAF 1023 is referred to as Ua interface, and the interface between the UE 101 and the BSF 1021 is referred to as Zn interface.

As described in conjunction with the method according to the first embodiment of the present invention, the monitor 1014 may be configured to monitor validity of limited-validity key information (e.g. MUK). The limited validity may be a lifetime t of the key information.

The acquirer 1015 (e.g. GBA Bootstrapping) may be configured to acquire from a network entity (e.g. BSF 1021) upon invalidity (e.g. t over) of the limited-validity key information, limited-validity transaction identification information (e.g. B-TID) based on unlimited-validity identification information (e.g. IMPI) identifying a terminal (e.g. UE 101).

The (key) generator 1011 may be configured to generate new limited-validity key information based on the acquired limited-validity transaction identification information (e.g. IMPI) and based on limited-validity master key information (e.g. Ks). In particular, the generator 1011 may be configured to perform functionalities as described herein above with reference to step S3.

And, the transmitter 1013 may be configured to transmit the acquired limited-validity transaction identification information (e.g. the acquired B-TID) to a network element (e.g. BM-SC, NAF). In particular, the transmitter 1013 may be configured to perform functionalities as described herein above with reference to step S4.

Additionally, the BM-SC 1023 may be configured to get, by means of the received limited-validity transaction identification information (e.g. the B-TID) via the Zn interface, limited-validity key information (e.g. a MUK) from the BSF 1021 corresponding to the limited-validity key information (e.g. a MUK) of the UE 101 e.g. as defined by 3GPP TS 33.220.

In other words, in this embodiment, the existing procedure may be used with a new parameter to indicate to BM-SC starting pull current e.g. MSK key procedure, wherein the new MSK may be configured to use a new MUK. In this case, the terminal (UE) 101 does not need to perform de-registration procedure. Instead, the UE 101 may attempt re-registration. In detail, there are two options how synchronized key update may be accomplished:

(a) The UE 101 may send a registration message to the BM-SC and use e.g. the BM-SC OPTION (new B-TID) to indicate the capability of updating the new MUK.

(b) The UE 101 may send a REGISTER (new B-TID, without MSK-list) and hence, using existing procedure without MSK list is to indicate no need to push MSKs. This approach would require different usage of the existing messages/parameters, but would have no impact to GBA related specifications.

Second Embodiment

Herein below, the second embodiment of the present invention is described with reference to FIGS. 3 and 4.

Figure 3:
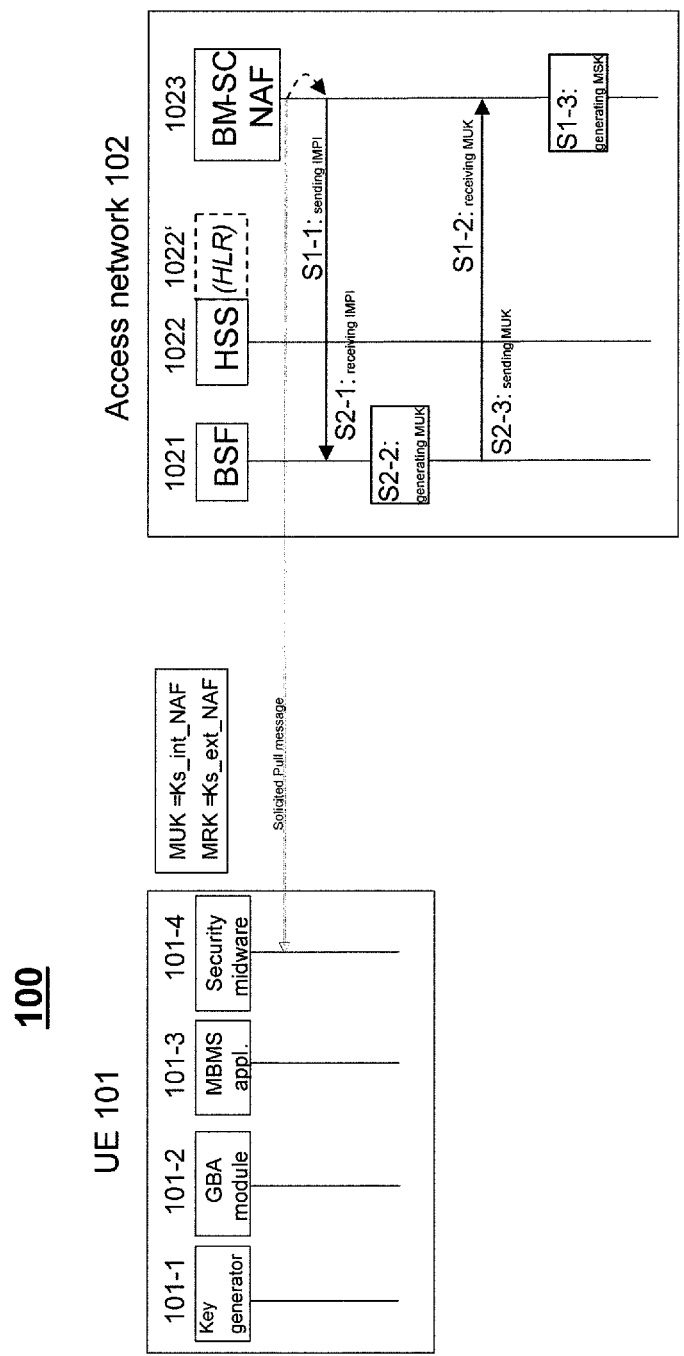
FIG. 3 shows a method for key update according to a second embodiment of the present invention.

FIG. 3 shows a method for key update according to the second embodiment of the present invention. Again, signaling between elements is indicated in horizontal direction, while time aspects between signaling are reflected in the vertical arrangement of the signaling sequence as well as in the sequence numbers. Reference signs in FIG. 3 identical with reference signs in FIG. 1 designate the same or similar means, the description of which is omitted for the sake of description brevity.

E.g. a predetermined time after issuing a solicited pull message, the BM-SC, NAF 1023 may in step S1-1 perform sending, to a network entity (e.g. BSF 1021), unlimited-validity identification information (e.g. IMPI) identifying a terminal (e.g. UE 101).

In step S2-1, receiving, from the network element (e.g. BM-SC, NAF 1023), unlimited-validity identification information (e.g. IMPI) identifying the terminal (e.g. UE 101) is performed.

In step S2-2, generating of limited-validity key information (e.g. MUK) synchronized with corresponding limited-validity key information of the terminal based on the received unlimited-validity identification information (e.g. IMPI) is performed e.g. by the BSF 1021.

In step S2-3, sending, to the network element (e.g. BM-SC, NAF 1023), of the generated limited-validity key information (e.g. MUK) is performed, which are received in step S1-2 at the BM-SC 1023, the received limited-validity key information (e.g. MUK) being synchronized with corresponding limited-validity key information of the terminal (e.g. e.g. UE 101).

And, in step S1-3, generating of limited-validity service information (e.g. MSK) using the received limited-validity key information (e.g. MUK) is performed so as to continue service flow e.g. with the UE 101.

Figure 4:
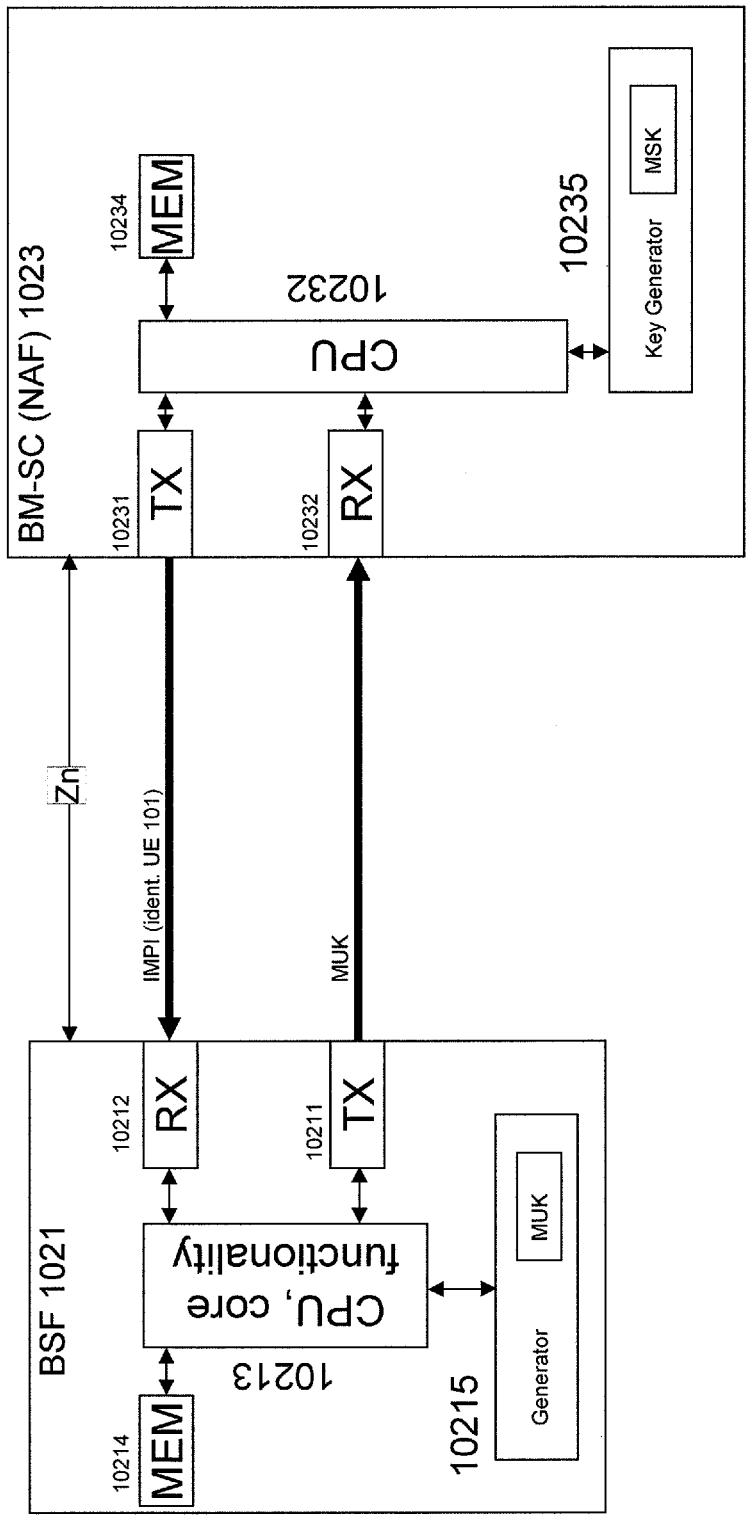
FIG. 4 shows apparatuses (e.g. a BM-SC acting as a NAF, and a BSF) for key update according to the second embodiment of the present invention.

FIG. 4 shows apparatuses (e.g. a BM-SC acting as a NAF, and a BSF) for key update according to the second embodiment of the present invention. It is to be noted that the NAF 1023 and the BSF 1021 may e.g. be implemented in separate devices, in which case all means 10211 to 10215 and 10231 to 10235 may be separate means. Alternatively, the NAF 1023 and the BSF 1021 may e.g. be implemented as functionalities, in which case all means 10211 to 10215 and 10231 to 10235 may be software portions or functionalities. For example, senders/receivers 10211, 10212, 10231, 10232 may be based e.g. on packet relay in case of separate means, or may be read/write operations from/into a shared memory 10214, 10234 in case of functionalities.

As described above with reference to FIG. 3, the sender 10231 of the BM-SC (NAF) 1023 may be configured to send, to the BSF 1021, unlimited-validity identification information (e.g. IMPI) identifying a terminal (e.g. UE 101).

The receiver 10212 of the BSF 1021 may be configured to receive, from the BM-SC (NAF) 1023, unlimited-validity identification information (e.g. IMPI) identifying a terminal (e.g. UE 101).

The (key) generator 10215 of the BSF 1021 may be configured to generate limited-validity key information (e.g. MUK) synchronized with corresponding limited-validity key information (e.g. MUK) of the terminal (e.g. UE 101) based on the received unlimited-validity identification information (e.g. IMPI).

The sender 10211 of the BSF 1021 may be configured to send, to the BM-SC (NAF) 1023, the generated limited-validity key information (e.g. MUK). In turn, the receiver 10232 of the BM-SC (NAF) 1023 may be configured to receive, from the BSF 1021, limited-validity key information (e.g. MUK) synchronized with corresponding limited-validity key information (e.g. MUK) of the terminal (e.g. UE 101).

And, the (key) generator 10235 of the BM-SC (NAF) 1023 may be configured to generate limited-validity service information (e.g. MSK) using the received limited-validity key information (e.g. MUK).

For the sake of completeness, the UE 101, having received the initial solicited pull message, may be configured e.g. to perform bootstrapping with the BSF 1021 to obtain e.g. the B-TID using the IMPI of the UE 101, and then e.g. to derive a MUK from the master key Ks, the MUK of the UE 101 corresponding to the MUK of the BM-SC 1023.

In other words, according to the second embodiment of the present invention, the BM-SC 1023 may be configured to contact the (GBA) BSF 1021 shortly after solicited pull message is sent to the UE 101. E.g. the solicited pull procedure from TS 33.246 is used for MSK update purpose. The UE 101 may use the NAF_ID already in bootstrapping procedure (change in GBA Ub interface), so as to inform GBA server which bootstrapping procedure will be indicated to which BM-SC. When applied to 3GPP, the second embodiment may change a Ub reference point as defined e.g. TS 29.109 for GBA and in TS 33.246.

Other Embodiments

For the purpose of the present invention as described herein above, it should be noted that an access technology may be any technology by means of which a user equipment can access an access network. Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed line.

an access network may be any device, unit or means by which a station entity or other user equipment may connect to and/or utilize services offered by the access network; such services include, among others, data and/or (audio-) visual communication, data download etc.;

generally, the present invention is also applicable in those network/terminal environments relying on a data packet based transmission scheme according to which data are transmitted in data packets and which are for example based on the Internet Protocol IP. The present invention is, however, not limited thereto, and any other present or future IP or mobile IP (MIP) version, or, more generally, a protocol following similar principles as (M)IPv4/6, is also applicable;

a user equipment entity may be any device, unit or means by which a system user may experience services from an access network;

method steps likely to be implemented as software code portions and being run using a processor at the network element, are software code independent and can be specified using any known or future developed programming language as long as the functionality defined by the method steps is preserved;

generally, any method step is suitable to be implemented as software or by hardware without changing the idea of the present invention in terms of the functionality implemented;

method steps and/or devices, units or means likely to be implemented as hardware components at a mobile station or network element or module thereof are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on MBMS (Multimedia Broadcast Multicast Service); in particular, MBMS security-compliant software modules may be used; although secured MBMS is used as an example for a secured service herein above for descriptive purposes, any security architecture capable e.g. of authentication, authorization, keying and/or traffic protection may be applied;

devices, units or means (e.g. User equipment, BSF, and NAF) can be implemented as individual devices, units or means, but this does not exclude that they are implemented in a distributed fashion throughout the system, as long as the functionality of the device, unit or means is preserved.

All embodiments according to the present invention are feasible, but their impacts e.g. on 3GPP specifications may be different. As a prerequisite, user experience should not be impacted. Changes to GBA for this purpose may then result in impacts to other specifications that build upon those.

The table below is for information, showing the relationship between GBA and MBMS keys.

|  |  |  |  | \multicolumn{2}{c}{GAA Generic Authentication Architecture (GAA) extends cellular authentication to non-cellular services} |  |
|---|---|---|---|---|---|---|
|  | \multicolumn{3}{c}{MBMS Multimedia Broadcast/Multicast Service (MBMS) is point-to-multipoint service where a service is able to securely transmit data to a given set of users.} | Normal GBA all key operations | GBA_U key operations are divided between |  |
| Key | Purpose | Type | Usage | are done in ME | ME and UICC | Notes |
| MTK | Data protection (MBMS Traffic Key) | Service specific | MTK is used to encrypt MBMS data in BM-SC, and decrypt MBMS data in UE | Derived and used in the ME | Derived in UICC, used in ME | MTK is always used to decrypt MBMS data in ME UE: MTK is derived from MSK either in UICC (GBA_U) or in ME (normal GBA). |
| MSK | Data protection (MBMS Service Key) | Service specific | MSK is used to derive service specific MTKs. (MSK is longer lived than MTK) | Stored and used in the ME | Stored and used in UICC | MSK is generated by BM-SC (does not originate from GAA) UE: MSKs are stored in UICC (GBA_U) or in ME (normal GBA). |
| MUK | Key distribution (MBMS User Key) | User specific | MUK is used to encrypt MSKs in BM-SC before they are sent to UE using MIKEY. UE decrypts MSKs using MUK. | Derived from Ks_NAF in ME and in BM-SC (derived and used in ME) | Ks_int_NAF (derived and used in UICC, not given to ME) | GAA is used to derive MUK. UE: MUK is used to decrypt MSKs in UICC (GBA_U) or in ME (normal GBA). |
| MRK | Authentication (MBMS Request Key) | User specific | Used to authenticate UE's MSK request in BM-SC (using HTTP Digest) | Derived from Ks_NAF in ME and in BM-SC (derived and used in ME) | Ks_ext_NAF (derived in UICC, given and used in ME) | GAA is used to derive MRK. UE: MRK is derived in UICC (GBA_U) or in ME (normal GBA) and always used in ME. |

LIST OF ABBREVIATIONS

MBMS Multimedia Broadcast Multicast Service (TS 33.246)
MUK MBMS User Key (TS 33.246)
MSK MBMS Service Key (TS 33.246)
BSF Bootstrapping Serving Function (specified in TS 33.220)
GBA Generic Bootstrapping Architecture (specified TS 33.220)
BM-SC Broadcast Multicast Service Center

The invention claimed is:

1. An apparatus comprising a user equipment, the apparatus comprising:
at least one processor; and
at least one memory including computer program code, the at least one processor, the at least one memory, and the computer program code configured to cause the apparatus to at least:
monitor a validity of a multimedia broadcast multicast service user key, wherein the multimedia broadcast multicast service user key is associated with a bootstrapping transaction identifier; and
when the monitoring of the validity of the multimedia broadcast multicast service user key indicates that the multimedia broadcast multicast service user key is invalid:
acquire, from a bootstrapping server function, another bootstrapping transaction identifier, wherein the acquiring is based at least on an international mobile subscriber persistent identity identifying the apparatus;
generate, based at least on the other bootstrapping transaction identifier, another multimedia broadcast multicast service user key; and
transmit, to a network element comprising a network application function, an indication for the network application function to acquire the other multimedia broadcast multicast service user key from the bootstrapping server function.

2. The apparatus according to claim 1, wherein the indication is transmitted in a portion of a registration message, and wherein the indication comprises the other bootstrapping transaction identifier.

3. The apparatus according to claim 2, wherein the transmission of the other bootstrapping transaction identifier enables the network application function to acquire the other multimedia broadcast multicast service user key from the bootstrapping server function.

4. The apparatus according to claim 1, wherein the indication is transmitted as a register command, wherein the indication comprises an absence of a multimedia broadcast multicast service key from the register command, and wherein the absence of the multimedia broadcast multicast service key indicates a service continuity.

5. The apparatus according to claim 4, wherein the multimedia broadcast multicast service key comprises limited-validity service key information.

6. The apparatus according to claim 1, wherein the apparatus is further configured to at least:
establish a limited-validity master key information; and
derive the other multimedia broadcast multicast service user key based at least in part on the established limited-validity master key information.

7. The apparatus according to claim 1, wherein the the multimedia broadcast multicast service user key and the other multimedia broadcast multicast service user key comprise limited-validity key information.

8. The apparatus according to claim 1, wherein the bootstrapping transaction identifier and the other bootstrapping transaction identifier comprise limited-validity transaction identification information.

9. The apparatus according to claim 1, wherein the international mobile subscriber persistent identity comprises unlimited-validity identification information.

10. The apparatus according to claim 1, wherein the network element further comprises a broadcast-multicast service center.

11. The apparatus according to claim 1, wherein at least one of the bootstrapping server function and the network application function are implemented in a semiconductor device.

12. The apparatus according to claim 1, wherein the apparatus is configured to receive data from the network application function.

13. The apparatus according to claim 12, wherein the apparatus is further configured to:
 decrypt, based at least on the multimedia broadcast multicast service key, the data received from the network application function, while the multimedia broadcast multicast service key is valid.

14. The apparatus according to claim 12, wherein the data received from the network application function is decrypted based at least the other multimedia broadcast multicast service key, subsequent to the multimedia broadcast multicast service key becoming invalid.

15. A non-transitory computer-readable medium encoded with instructions that, when executed by at least one processor, perform at least the following:
 monitoring, at a user equipment, a validity of a multimedia broadcast multicast service user key, wherein the multimedia broadcast multicast service user key is associated with a bootstrapping transaction identifier; and
 when the monitoring of the validity of the multimedia broadcast multicast service user key indicates that the multimedia broadcast multicast service user key is invalid:
  acquiring, from a bootstrapping server function, another bootstrapping transaction identifier, wherein the acquiring is based at least on an international mobile subscriber persistent identity identifying the apparatus;
  generating, based at least on the other bootstrapping transaction identifier, another multimedia broadcast multicast service user key; and
  transmitting, to a network element comprising a network application function, an indication for the network application function to acquire the other multimedia broadcast multimedia user key from the bootstrapping server function.

* * * * *